United States Patent
Fischer

[15] 3,675,945
[45] July 11, 1972

[54] DUPLEX IMPLEMENT HITCH
[72] Inventor: Raymond G. Fischer, Hinsdale, Ill.
[73] Assignee: International Harvester Company, Chicago, Ill.
[22] Filed: Oct. 16, 1970
[21] Appl. No.: 81,237

[52] U.S. Cl. .................................................. 280/411 C
[51] Int. Cl. ............................................................. B60d 1/00
[58] Field of Search............ 280/411 R, 411 A, 411 B, 411 C, 280/412, 413

[56] References Cited
UNITED STATES PATENTS
3,169,027  2/1965  Oerman ............................. 280/411 A
3,436,098  4/1969  Orendorff et al. ..................... 280/412
3,493,248  2/1970  Tasset ................................. 280/411 A
3,522,860  8/1970  Purrer et al. ........................ 280/413 X

*Primary Examiner*—A. Harry Levy
*Attorney*—Floyd B. Harman

[57] ABSTRACT

A pair of side by side tractor propelled implement units are connected to a duplex hitch for operation over a broad area and are shiftable to tandem positions with the duplex hitch disposed therebetween for transporting the implement by propelling force of the tractor connected to one of the implement units.

2 Claims, 7 Drawing Figures

INVENTOR
RAYMOND C. FISCHER

INVENTOR
RAYMOND C. FISCHER
BY _F. David McBurton_ ATT'Y.

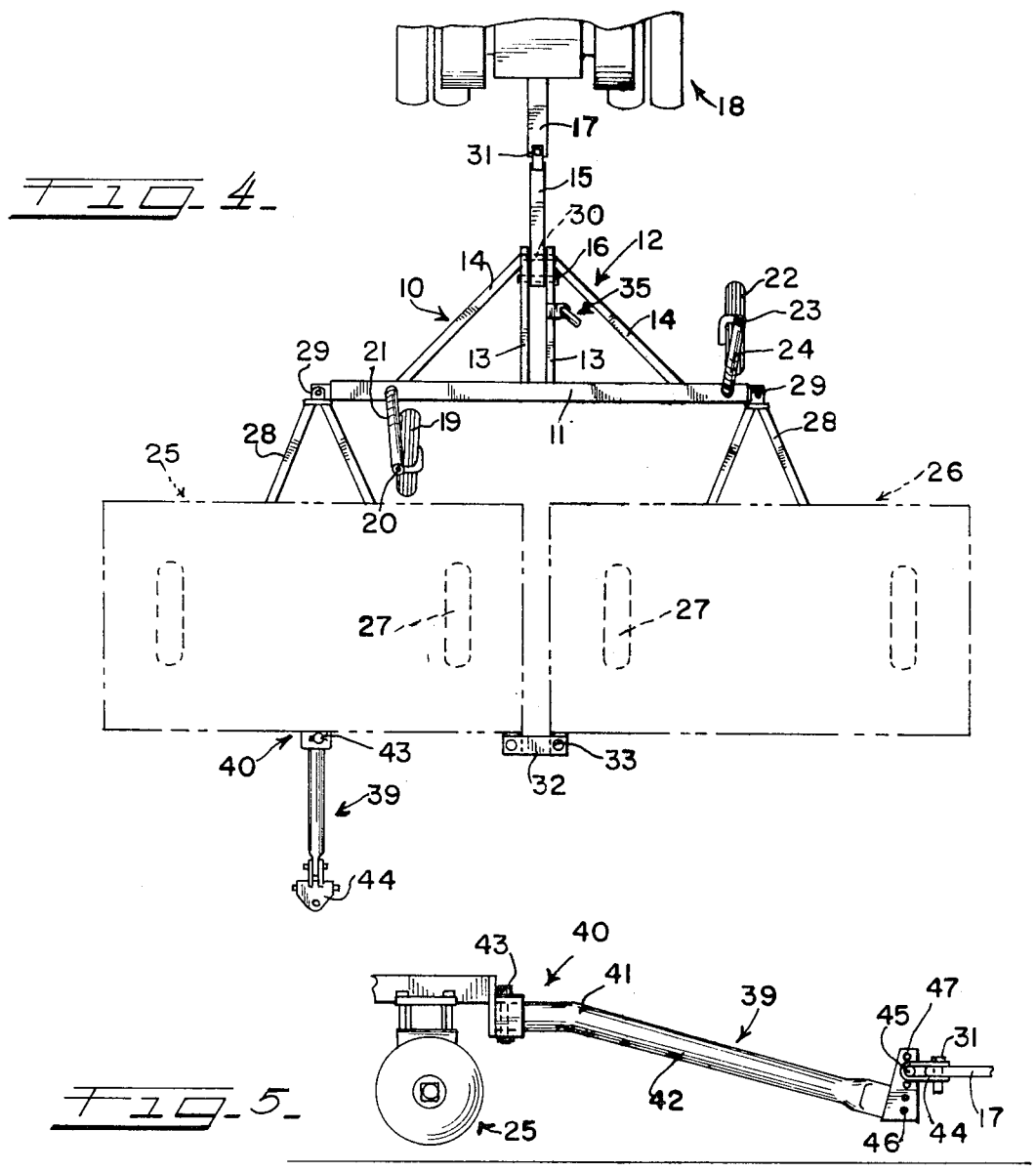
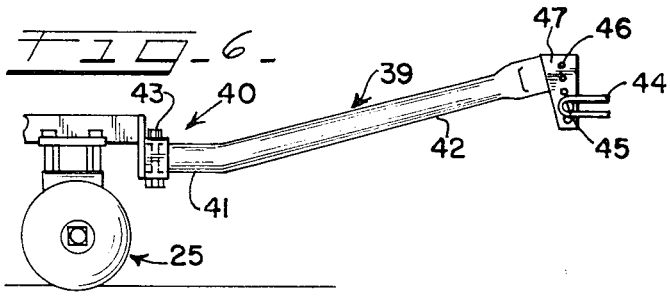
INVENTOR
RAYMOND C. FISCHER
BY ATT'Y

DUPLEX IMPLEMENT HITCH

BACKGROUND OF THE INVENTION

This invention relates to duplex implement hitches and particularly to means by which a pair of tractor drawn implement units are propelled in either transversely aligned or tandem relation.

The practice of duplexing implements by arranging two or more implement units side by side to cover a wide area of ground in each passage across a field is well known. However, transportation of such implements through gates and over roadways presents a substantial problem, and it is customary to rearrange the duplexing hitch and the implement units to dispose the latter in tandem and thus reduce the transport width as nearly as possible to that of one of the units. Such hitching mechanisms as have come into use have been along the lines of utilizing the same hitching apparatus in both operating and transport or tandem positions of the implement units, and this has involved complicated devices requiring detachment of the units from the hitch and rearranging them in a different location when converting from operation to transport, or in detaching and rearranging the hitch parts so that the hitch could adequately function in both positions. The result has been that such convertible hitches have been complicated and expensive and have involved the expenditure of considerable time and effort on the part of one or more operators to effect the conversion. Therefore, the principal object of the present invention is to provide a novel implement and hitch combination of simple and economical construction requiring a minimum of manual operations on the part of an operator in effecting the conversion from operation to transport and vice versa.

Another object of the invention is the provision of a duplex hitch arrangement for multiple implement units wherein the hitch structure to which a pair of side by side implement units are connected for field operation, is disconnected from the tractor and automatically aligns itself with the direction of travel between the units by the propelling power of the tractor when the latter is attached to a selected one of the implement units for transport.

Another object of the invention is the provision of a tractor connected duplex hitch for side by side implement units including a transverse drawbar to the ends of which the units are pivotally connected by forwardly projecting draft means, wherein one of the implement units has a rearwardly projecting auxiliary coupling tongue to which the tractor may be optionally connected and wherein the propelling power of the tractor applied to said one of the implement units swings the units about their draft pivots and propels them automatically into tandem relation behind the tractor with said drawbar therebetween.

DESCRIPTION OF THE DRAWINGS

FIG. 4 is a plan view showing the completed conversion from tandem transport to field operation after the tractor has been disconnected from the auxiliary tongue of the selected implement unit and reattached to the duplex hitch tongue, and with the inner ends of the implement units locked together;

FIG. 5 is a detail in side elevation of the auxiliary tongue showing its attachment to the rear of one of the implement units and to the tractor drawbar when the units are in transport position as in FIG. 1, so that the rear of the towing implement unit faces forwardly;

FIG. 6 is a view similar to FIG. 5 of the auxiliary tongue reversed about its axis to dispose the free end of the tongue in an elevated non-operating position when the implement unit is ready for field operation, as in FIG. 4; and FIG. 7 is an enlarged detail in side elevation showing the mounting of one of the supporting wheels for the implement hitch.

DESCRIPTION OF THE PREFERRED EMBODIMENT

Figure 1:
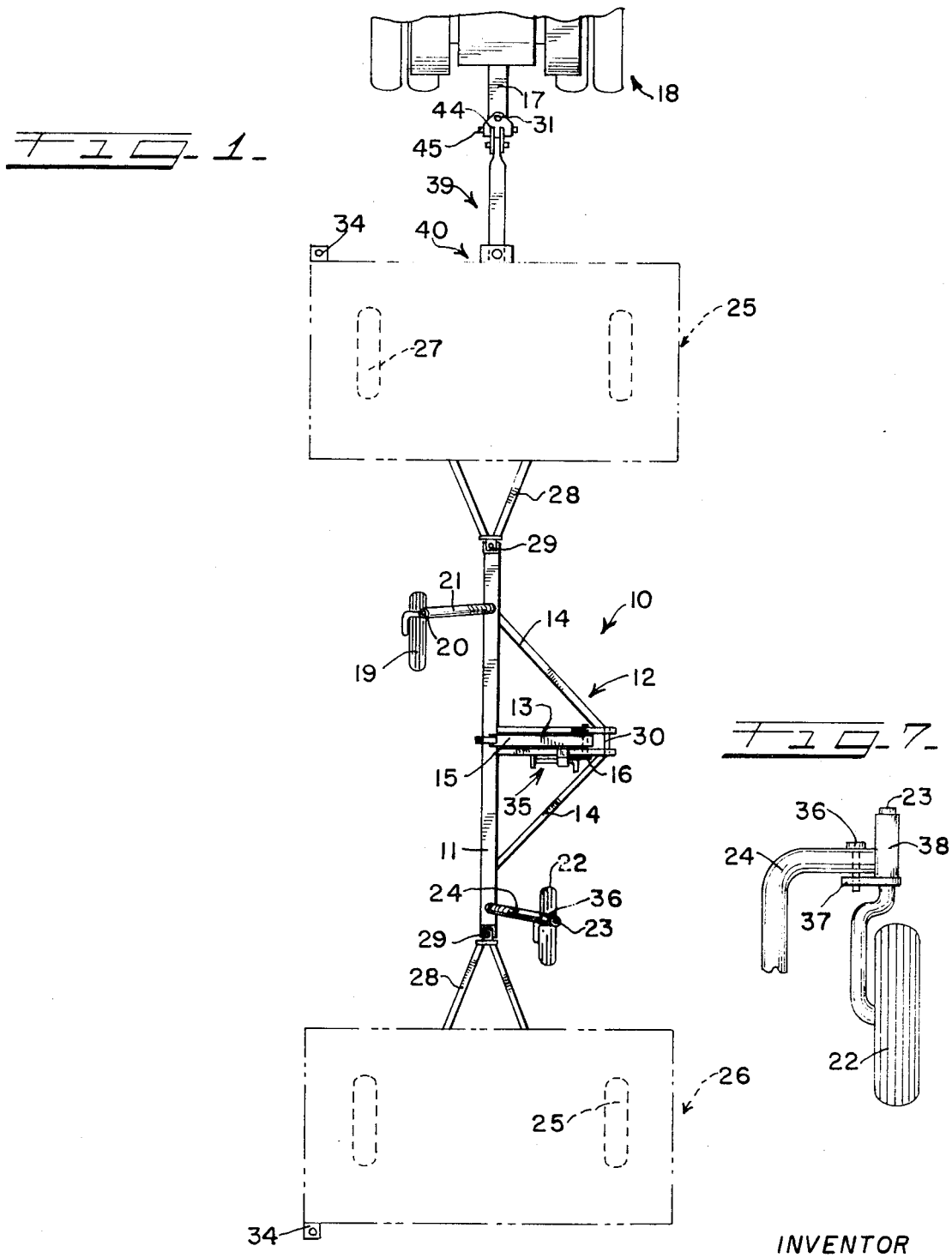
FIG. 1 is a diagrammatic plan view showing the rear end of a tractor to which the duplex hitch and implement assembly of this invention is connected with the implement units in tandem for transport.

It will be noted that the duplex hitch of this invention is designated generally by the numeral 10 and comprises a transversely extending drawbar 11 and forwardly extending hitch means 12 including laterally spaced hitch bars 13 connected by braces 14 to drawbar 11. A draft link or tongue 15 is pivotally mounted at its rear end on a pin 16 carried by hitch bars 13 and, in the operating position of FIG. 4, its forward end is shown as pivotally connected to the drawbar 17 of a propelling tractor 18.

The duplex hitch structure 10 is supported in the position of FIG. 4 by means accommodating angular movement of the hitch structure about a vertical axis, said supporting means comprising a wheel 19 mounted for castering on a vertical spindle 20 carried by an arm 21 affixed to and extending upwardly and rearwardly from drawbar 11. Another castering wheel 22 is mounted on a vertical spindle 23 carried by the forwardly projecting end of an arm 24 affixed to drawbar 11 at a location laterally spaced from arm 21.

The implement units illustrated are designated 25 and 26 and are shown schematically in FIGS. 1 to 4. These implement units may be planters or disk harrows or the like, FIGS. 5 and 6 showing a portion of a disk harrow. Although the kind of implement units employed is not important to the invention as claimed, they should be provided with wheels indicated at 27 which may be supported in any well known manner to facilitate transport of the implement.

Left and right hand units 25 and 26 are provided with forwardly projecting triangularly shaped draft means 28 the forward ends of which are connected by pivot pins 29 to opposite ends of drawbar 11 to accommodate horizontal swinging of the implement units 90° in opposite directions relative to drawbar 11 about the axes of pins 29 from the transversely aligned operating positions of FIG. 4 parallel to drawbar 11 to positions in alignment with the drawbar, as in FIG. 1.

Figure 2:
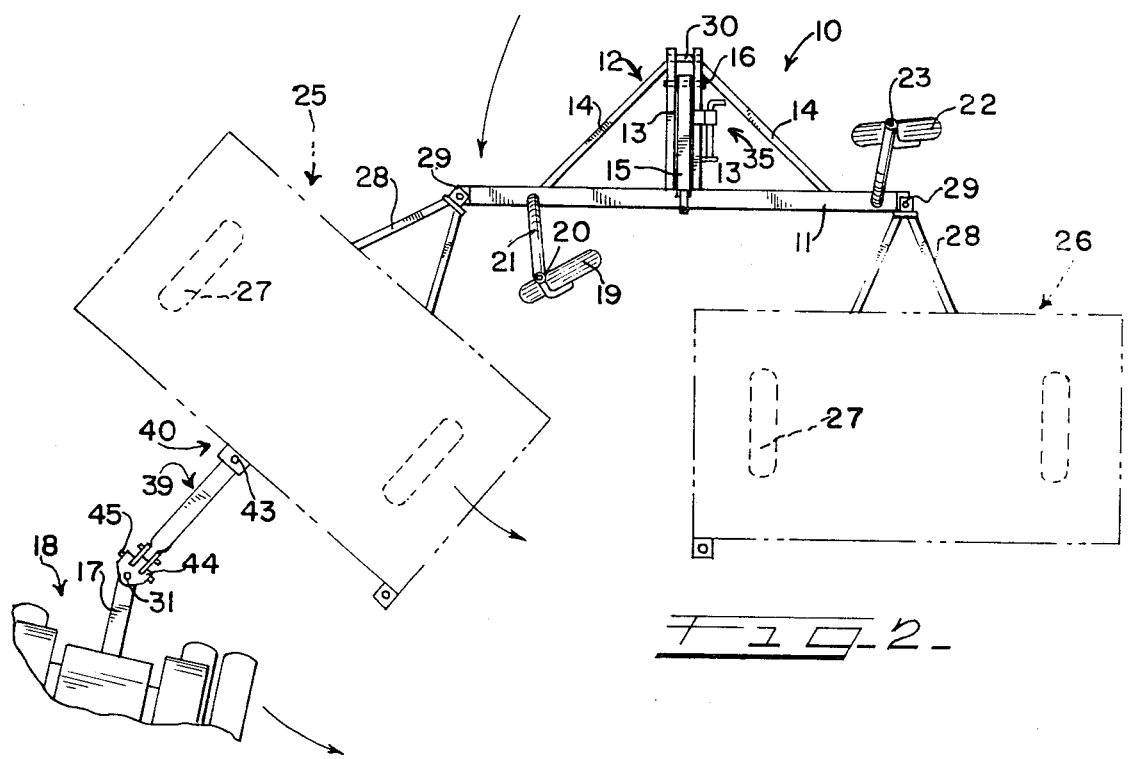
FIG. 2 is a plan view illustrating the manner in which the tractor is turned to automatically bring the implement units and hitch into position for field operation.
Figure 3:
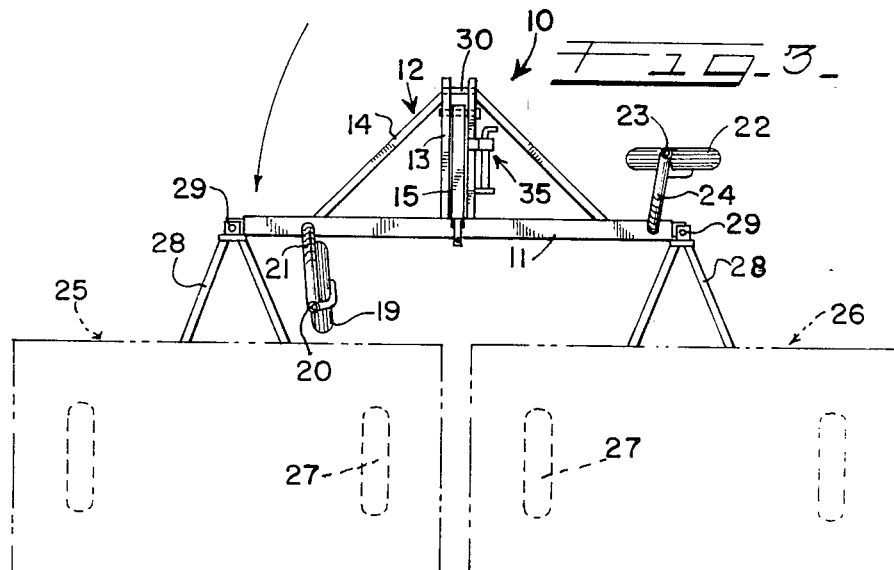
FIG. 3 is a view similar to FIG. 2, showing a completed 180° turn of the tractor from the position of FIG. 1 with the implement units transversely aligned in their operating position.

In the operating position of FIG. 4 draft link or tongue 15 is made rigid by a locking pin 30 insertable in aligned openings provided in the tongue and in hitch bars 13 and the entire implement and hitch structure is laterally swingable about the axis of a vertical hitch pin 31 carried by tractor drawbar 17. During operation the implement units 25 and 26 are locked together by a tie bar 32 secured by bolts 33 to lugs 34 projecting rearwardly from the inner ends of the units. Also, the hitch structure 10 is provided with an adjustable jack stand 35 pivotally mounted by means well known in the art on hitch bars 13. In FIGS. 1 to 3 the jack stand is shown in its folded or inoperative position parallel to hitch bars 13.

To convert the implement from the field operating position of FIG. 4 to the transport position of FIG. 1, the jack stand 35 is rotated 90° from the positions of FIGS. 1 to 3 to a ground engaging position of support for the hitch structure, as indicated in FIG. 4, and hitch pin 31 is removed to disconnect the hitch structure 10 from the tractor. Locking pin 30 is withdrawn and the hitch tongue 15 is pivoted rearwardly upon drawbar 11, as indicated in FIGS. 1 to 3, and pin 30 is replaced in hitch bars 13. Tie plate 32 is then removed to unlock the implement units. Caster wheel 22 is aligned parallel to drawbar 11 and is locked by inserting a locking pin 36 in an opening provided in arm 24 and a registering opening in a lug 37 affixed to spindle 23 below vertical spindle bearing 38, as shown in FIG. 7.

In FIGS. 5 and 6 the implement unit 25 is indicated to be a disk harrow, to the rear of which a draft tongue 39 is secured by suitable clamping means 40. Tongue 39 comprises a horizontal portion 41 and a bent portion 42 inclined from the horizontal. In the field operating position of FIG. 4 the tongue 39 is not in use and the bent portion 42 thereof is directed upwardly to provide ground clearance. Continuing the conversion of the implement to transport position, a pin 43 forming a part of the clamping means 40 is withdrawn and the tongue rotated 180° from the inoperative position of FIG. 6 to the operating position of FIG. 5. The operator drives the tractor, which has been detached from hitch structure 10, to a position facing in the opposite direction from that of FIG. 4, and moves the tractor to the rear of implement unit 25. He attaches the tractor drawbar 17 by the hitch pin 31 to a clevis 44 mounted on a transverse pivot pin 45 carried in a selected one of a plurality of vertically spaced openings 46 in a plate 47 affixed to the rear end of draft tongue 39. Jack stand 35 is now folded from its hitch supporting position as in FIG. 4, to the inoperative position of FIGS. 1 to 3.

The operator drives the tractor and implement units forwardly, imparting angular movement to drawbar 11 to swing it around into alignment behind unit 25 and parallel to the direction of travel. As the hitch structure swings into line behind implement unit 25 it is followed by right hand implement unit 26, which travels in an arcuate path until it assumes a position in alignment with drawbar 11 and in tandem relation to unit 25 to complete the transport conversion to the position shown in FIG. 1 with the implement units perpendicular to drawbar 11.

The procedure shown in FIGS. 2 and 3 is followed to return the implement from the position of FIG. 1 to the field position of FIG. 4. The tractor operator merely steers the tractor to the left to face in the opposite direction. In the position of FIG. 2, right hand implement unit 26 is substantially stationary while the left hand implement unit 25 is swinging about the axis of its hitch pin 29, and the duplex hitch pivots about the pin 29 connecting it to implement unit 26, until unit 25 reaches the position alongside implement unit 26 as shown in FIG. 3. At this point the operator unfolds and locks hitch tongue 15 and rotates jack stand 35 from its inoperative position as indicated in FIGS. 1 to 3 to its ground engaging position as indicated in FIG. 4 to support the hitch. He then disconnects the tractor from auxiliary tongue 39 and reconnects it to hitch tongue 15. Tongue 39 is reversed to the field position of FIG. 6, tie plate 32 is secured to the lugs 34, wheel 22 is unlocked so it is free to caster, and jack stand 35 is returned to its inoperative position. The implement is then ready for field operation.

It should be clear that the novel convertible implement and hitch structure of this invention requires a minimum of manual operations, and such operations involve merely the installation and removal of a few attaching pins, all of the heavy work being performed by the tractor. Furthermore, the implement units 25 and 26 remain attached to the hitch during conversion, which requires only hitching to the tractor, in contrast to backing up a train of units to hitch the last implement for transport with conventional duplex hitches.

What is claimed is:

1. A tractor drawn duplex implement and hitch combination convertible from a side by side operating position of the implement units to a tandem transport position thereof comprising, a transverse drawbar having hitch means thereon for attachment to the tractor, a pair of implement units in side by side relation having draft means projecting forwardly therefrom, pivot means connecting said draft means to opposite ends of said drawbar to accommodate swinging of the implement units in opposite directions relative to the drawbar to a tandem position in alignment with and at opposite ends of the drawbar, and optionally operable auxiliary tongue means on the rear of one of said implement units attachable to the tractor upon disconnection thereof from said hitch means to accommodate transporting the implement with the implement units and drawbar in longitudinal alignment with the tractor, said drawbar supported in both operating and transport positions by ground-engaging wheels, said wheels being adapted for castering in the operating position of the implement and drawbar and optionally operable means being provided for locking one of said wheels against castering in the tandem transport position of the implement, releasable locking means for connecting the inner ends of said implement units in their side by side operating position to hold them in spaced relation, said locking means being releasable to accommodate relative swinging movement of the implement units into alignment with the drawbar and tractor when the latter is connected to said auxiliary tongue for transporting the implement, and said hitch means including a draft link pivotally mounted on said hitch means for folding from an inoperative position within the confines of said hitch means to an operative forwardly projecting position for connecting to the tractor, means being provided for rigidly securing said draft link to the hitch means in the operating position of the implement.

2. The invention set forth in claim 1, wherein said auxiliary tongue means extends rearwardly from said one of said implement units in the operating position of the implement for optional connection to the tractor upon disconnection of the latter from said hitch means, said auxiliary tongue being bent to dispose its outer tractor attaching end vertically spaced below the connection thereof to said implement unit in the transport position of the implement, said auxiliary tongue being rotatable about its longitudinal axis to dispose its outer end above the connection of its other end to said implement unit to provide ground clearance therefor when the implement units are in their operating position.

* * * * *